UNITED STATES PATENT OFFICE.

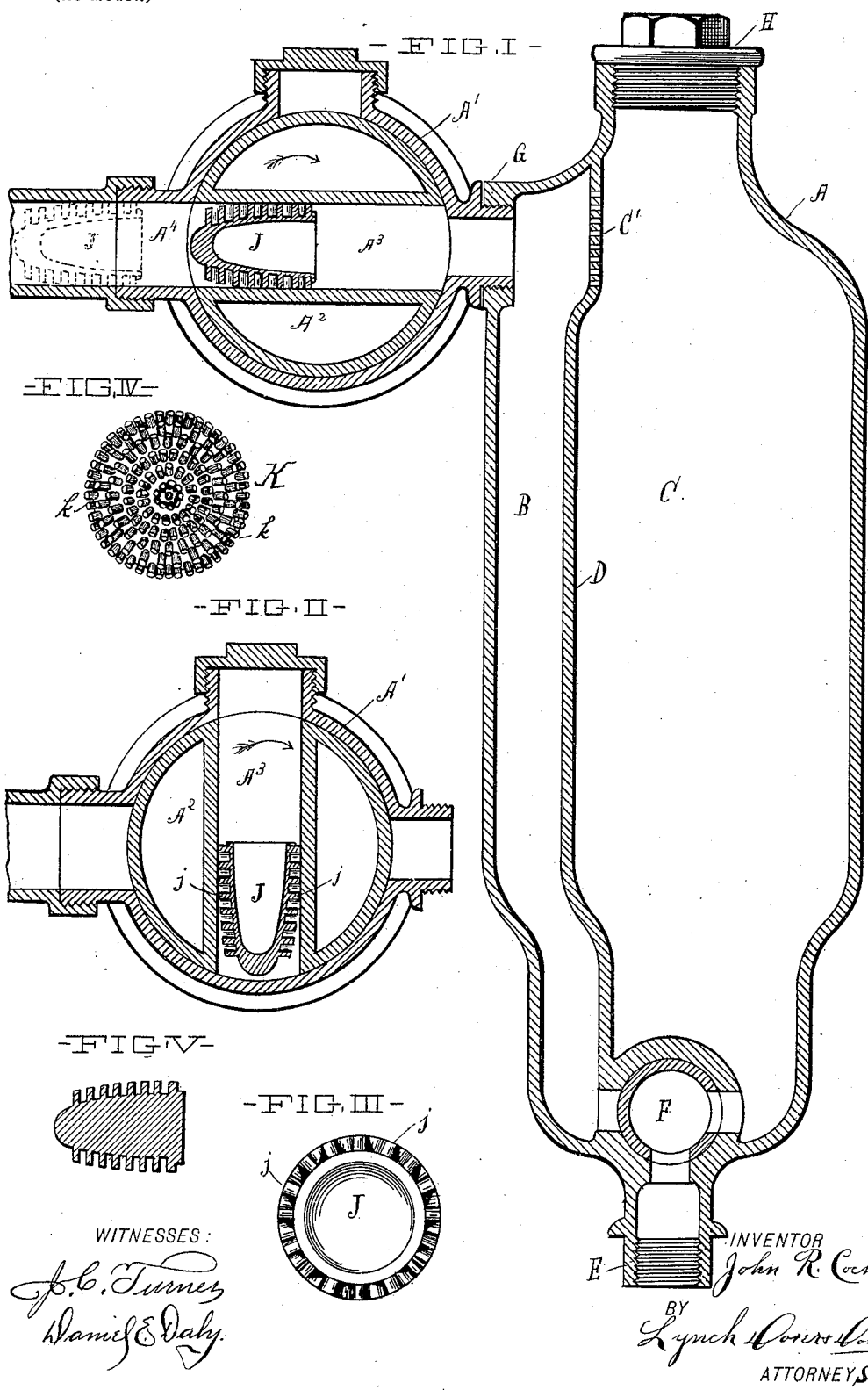

JOHN R. COCHRAN, OF NEW YORK, N. Y., ASSIGNOR TO ANDREW J. ROCHE, OF CLEVELAND, OHIO.

HOSE-CLEANER.

SPECIFICATION forming part of Letters Patent No. 616,696, dated December 27, 1898.

Application filed March 10, 1898. Serial No. 673,354. (No model.)

*To all whom it may concern:*

Be it known that I, JOHN R. COCHRAN, of the city, county, and State of New York, have invented certain new and useful Improvements in Hose or Pipe Cleaners; and I do hereby declare the following to be a full, clear, and exact description of the invention, such as will enable others skilled in the art to which it pertains to make and use the same.

My invention relates to methods of cleaning and cleaners for the interior of hose or pipe, and more especially such hose or pipes as are used by brewers in racking off beer. During the process of racking off beer the hose or pipes used as conveyers become fouled or dirty in the interior and it becomes necessary to clean the hose or pipe. Inasmuch as the dirt or foreign matter generally adheres firmly to the wall of the hose or pipe, it is not an easy matter to dissolve, loosen, or discharge it. By the use of my method and devices the dirt collected in the tubes is thoroughly loosened or dissolved and carried off or discharged, leaving the interior of the tubing or hose clean and "sweet."

In the drawings, Figure I is a view in vertical section of a device constructed according to my invention. Fig. II is a detached view in section of what I call the "swab receiver, director, and guide," showing the same in position to receive the swab. Fig. III is an end view of a so-called "flexible" swab used in connection with my method and devices. Fig. IV shows the swab constructed in the form of a ball. Fig. V illustrates a cartridge-shaped swab formed with a solid center.

A represents a chambered casing.

B and C represent the two chambers of casing A. The chambers B and C are separated by a partition D and are adapted to communicate at their lower end with a water-supply connection E.

F represents a multiple or three-way valve or cock which controls the supply of fluid to either or both chambers B C, as desired or found necessary.

G represents an outlet and connection adapted by means of suitable-sized couplings to be placed in communication with a chamber A', which will be hereinafter described.

This outlet or connection G has communication with chamber B directly and with chamber C through screens C'.

H represents a cap or cover whereby the interior of casing A may be reached for cleaning purposes or for supplying the apparatus with suitable chemicals for mixing with the water for loosening or dissolving the dirt in the hose or pipes.

The chamber A', which communicates with chamber B through outlet or coupling G, is provided with a rotary valve $A^2$, capable of rotating therein. The valve $A^2$ is provided with a port or way $A^3$ of diameter slightly larger than the mouth $A^4$ of the chamber A'. The valve $A^2$ has a double function—viz., it acts to control (turn on or shut off) the flow from chamber B to the hose or pipe to be cleaned or from the hose back to chamber B. The valve $A^2$ acts as a receiver, director, and guide for certain swabs which are constructed and used as follows:

K represents a scrubbing-ball having a solid center and flexible radial points $k$ $k$, extending from its surface in every direction. (See Fig. IV.) The scrubbing device J may be a hollow and cartridge-shaped swab, preferably formed of rubber or elastic material and formed on its exterior with radial projections $j$ $j$. The greatest exterior circumference of the swab is such as to cause it to fit snugly in the hose or pipe to be cleaned, and it is formed hollow, so as to allow it to pass through couplings which are generally slightly less in diameter than the interior of the hose-sections or pipes. The projections $j$ $j$ also give as the swab is driven along by the force of the water. These swabs J may be formed of any suitable contour and in some cases may be formed solid, as shown in Fig. V, instead of hollow. They are, however, better for the purpose when they are shaped hollow and as described above.

The method and operation are as follows: One side or chamber C of casing A is supplied with a suitable chemical, such as an alkali, adapted to soften, dissolve, or loosen the dirt from the interior of the hose or pipe, the chemical being fed through cap H. The cap H is then secured in place and the valve or cock F is regulated so as to admit water, which flows through the chemical and becomes saturated more or less with said chemical. The saturated water or mixture passes from chamber C through port or way $A^3$ of valve $A^2$ when said port or way $A^3$ is in position illustrated in Fig. I. The above operation is all that is necessary to loosen or soften the matter in the interior of the hose or pipe; but the dirt is not carried off or out of the pipe or hose. In order to carry off the dirt from the interior of the pipe or hose, I find that it is necessary to use a swab or brush of some kind, which will engage the inner surface of the hose or tube and free the dirt or wipe it off and carry it along through the hose or tube to the outlet thereof. Hence I have provided the swabs J, hereinbefore set forth, for this purpose. The swabs are fed or supplied to the hose to be cleaned as follows: Valve-port $A^3$ is adjusted, as shown in Fig. II, so that said port is in line with opening $a$ on the top of the casing $A'$. A swab J is then dropped in the way or port, as shown, and the valve turned in the direction of the arrow, which presents the pointed end of the swab toward the hose or tube to be cleaned. The above manipulation of the valve $A^2$ also brings the open end of the swab against the force of the stream, and water entering the swab forces it along the tube or hose, enlarges it, and forms an eddy which scours the inner surface of the hose or tube. Swabs of like construction are fed at intervals, and thus the interior of the hose or tubing is actually scrubbed clean. The hose or tube is rinsed out by causing the water to pass up through chamber B and thence through the hose or tubing without coming in contact with the chemical in chamber C.

What I claim is—

1. A pipe or hose cleaner of the character set forth, comprising a casing or receptacle, a partition for dividing said casing longitudinally into two chambers, a valve having two ways or ports controlling communication between the fluid-supply and said chambers, a screen formed in said partition and constituting the upper portion thereof, and an outlet opposite the screen, substantially as and for the purpose shown and described.

2. A pipe or hose cleaner of the type described, comprising a chambered casing having communication with a fluid-supply controlled by a valve at its lower end, and a side outlet at the upper end of said casing, a partition extending throughout the length of the casing, a screen formed in and constituting the upper portion of said partition, and a rotary valve secured to and in communication with the said side outlet, substantially as and for the purpose set forth.

3. A pipe-cleaner comprising a casing adapted to be interposed between the fluid-supply and the hose or pipe, and adapted to contain suitable chemicals, a swab, a swab-feeder adapted to be manipulated so as to receive the swab and deliver it to the hose or pipe substantially as set forth, said swab-feeder being located between the outlet of the casing and the hose or pipe to be cleaned, all substantially as shown and described.

4. A device suitable for use in connection with the cleaning of hose or pipe, said device consisting of a hollow elastic swab provided with radial projections and having its closed end thickened to adapt it to receive the impact of fluid under pressure, substantially as shown and described.

5. A device for use in connection with pipe or hose cleaning consisting of a hollow elastic swab open at one end and closed at the opposite end, and provided with radial projections, the closed end of the swab being thickened to adapt it to receive the impact of fluid under pressure without unduly distending the swab longitudinally, substantially as and for the purpose shown and described.

6. An improved scrubbing device for cleaning hose, and the like, comprising a hollow body portion of tapering form closed at one end by a thickened or reinforced portion adapted to receive the impact of fluid under pressure, said body portion being provided on its outer surface with radial projections of flexible material.

7. An apparatus for cleaning hose, pipe, and the like, comprising a casing adapted to contain a suitable chemical, and provided with an outlet and a longitudinal partition, having a screen opposite the outlet, in combination with a valve having two ways or ports controlling communication between the fluid-supply and said chambers, a second casing communicating with the outlet of the first-mentioned casing, and containing a rotary valve provided with a passage-way adapted to receive a cleaning-swab.

In testimony whereof I sign this specification, in the presence of two witnesses, this 1st day of December, 1897.

JOHN R. COCHRAN.

Witnesses:
W. E. DONNELLY,
DANIEL E. DALY.